US00RE43117E

(19) United States
(12) Reissued Patent
Sokolov

(10) Patent Number: US RE43,117 E
(45) Date of Reissued Patent: Jan. 17, 2012

(54) METHOD OF AND APPARATUS FOR STUDYING FAST DYNAMICAL MECHANICAL RESPONSE OF SOFT MATERIALS

(75) Inventor: Igor Sokolov, Potsdam, NY (US)

(73) Assignee: Clarkson University, Potsdam, NY (US)

(21) Appl. No.: 13/103,566

(22) Filed: May 9, 2011

Related U.S. Patent Documents

Reissue of:
(64) Patent No.: 7,761,255
Issued: Jul. 20, 2010
Appl. No.: 11/713,468
Filed: Mar. 2, 2007

U.S. Applications:
(60) Provisional application No. 60/778,638, filed on Mar. 2, 2006.

(51) Int. Cl.
*G01K 11/30* (2006.01)

(52) U.S. Cl. ..... 702/134; 702/108; 702/109; 702/127; 702/135; 702/189; 702/190; 702/191; 73/1.45; 73/1.56; 73/1.89; 73/105; 250/309; 250/311; 850/56; 850/63

(58) Field of Classification Search ..... 702/108, 702/109, 127, 134, 135, 189, 190, 191; 73/1.45, 73/1.56, 1.89, 105; 250/309, 311; 850/56, 850/63

See application file for complete search history.

(56) References Cited

U.S. PATENT DOCUMENTS

RE33,387 E 10/1990 Binnig ..... 250/306
5,466,935 A * 11/1995 Ray et al. ..... 850/4
5,804,709 A * 9/1998 Bourgoin et al. ..... 73/105

OTHER PUBLICATIONS

Park S, Koch D, Cardenas R, Kas J, Shih CK. Cell motility and local viscoelasticity of fibroblasts, Biophys J 2005;89(6);4330-42.
Berdyyeva TK, Woodworth CD, Sokolov I. Human epithelial cells increase their rigidity with ageing in vitro: direct measurements. Physics in Medicine and Biology 2005;50(1):81-92.
Garland JE, Pettit CM, Roy D. Analysis of experimental constraints and variables for time resolved detection of Fourier transform electrochemical impedance spectra. Electrochimica Acta 2004;49:2623-2635.
Popkirov GS, Schindler RN. The Perturbation Signal for Fast Fourier Transform Electrochemical Impedance Spectroscopy (FFT-EIS), Bulg. Chem. Comm. 1994;27:459.
Mahaffy RE, Park S, Gerde E, Kas J, Shih CK. Quantitative analysis of the viscoelastic properties of thin regions of fibroblasts using atomic force microscopy. Biophys J 2004;86(3):1777-93.

(Continued)

*Primary Examiner* — Sujoy Kundu
(74) *Attorney, Agent, or Firm* — Gerow D. Brill

(57) ABSTRACT

The invention is an apparatus and method including hardware and software, which allows collecting and analyzing data to obtain information about mechanical properties of soft materials in a much faster way. The apparatus can be used as a stand-alone deice or an add-on to the existing AFM device. The apparatus allows collecting dynamical measurements using a set of multiple frequencies of interest at once, in one measurement instead of sequential, one frequency in a time; measurements.

21 Claims, 1 Drawing Sheet

OTHER PUBLICATIONS

Mahaffy RE, Shih CK, MacKintosh FC, Kas J, Scanning probe-based frequency-dependent microrheology of polymer gels and biological cells. Phys Rev Lett 2000;85(4):880-3.

Alcaraz J, Buscemi L, Grabulosa M, Trepat X, Fabry B, Farre R, Navajas D. Microrheology of human lung epithelial cells measured by atomic force microscopy, Biophys J Mar. 2003;84(3):2071-9.

* cited by examiner

METHOD OF AND APPARATUS FOR STUDYING FAST DYNAMICAL MECHANICAL RESPONSE OF SOFT MATERIALS

Matter enclosed in heavy brackets [ ] appears in the original patent but forms no part of this reissue specification; matter printed in italics indicates the additions made by reissue.

CROSS REFERENCE

This application is related to provisional application 60/778,638 filed on Mar. 2, 2006 entitled "Method of studying fast dynamical mechanical response of soft materials with the atomic force microscopy method" and is hereby incorporated by reference.

FIELD OF THE INVENTION

This invention relates to the use of the Atomic Force Microscopy (AFM) method to study dynamical (in particular, viscoelastic) properties of soft tissue, in particular, biological tissues, cell, etc. The invented hardware/software is used to accelerate the time of measurements significantly.

BACKGROUND OF THE INVENTION

Mechanical properties of soft materials are of great interest. Studying mechanical properties is determined as collecting and processing data to obtain information about material rigidity, toughness, etc. in both static and dynamic (viscoelastic response) regimes. For example with biological cells, the study of cell mechanics is of great importance not only for bioengineering, but also for human health, since changes in the rigidity of tissues is implicated in the pathogenesis of many diseases. Atomic Force Microscopy (AFM) has been used to study cell rigidity for more than a decade having been disclosed by Binning in U.S. Pat. No. 4,724,318 issued on Feb. 9, 1988 (now Re. 33387 issued on Oct. 17, 1990) and hereby incorporated by reference. The main problems of this approach are in the nature of both objects of study (for example, biological cells) and the technique (AFM) itself. Cells, or any other soft heterogeneous surfaces being intrinsically variable and inhomogeneous objects, require a large number of measurements to attain statistically robust results. The AFM related problem is as follows. The time required for such data acquisition can be too long to be practical. During a long time of measurements, the characteristics of the test objects can change, which makes the process of measurement meaningless.

The problem of getting dynamical (for example, viscoelastic) data for soft samples, in particular, biological cells, is very time consuming in nature. While the technique is relevant to other samples, we will discuss biological cells as a representative example. Keeping cells viable and steady under the AFM for a long time is simply impractical. To date, one of the most detailed studies, Park et al, [1] was done by collecting force curves only in about three points per cell for the total statistics of about ten cells per cell line (three cell lines were analyzed). As one observes from Berdyyva et al [2], to make a statistical conclusion on a cell line, one would be expected to collect at least several hundreds of the force curves (16×16 force curves in the example of reference 2) per cell region (for example, three different regions were identify in the case of epithelial cell) with simultaneous collection of the surface topography of information. Knowledge of sample topography is paramount here because the surface must be flat to be processed with the existing models. The fastest way to collect both force and the surface topography is the use of the well-known force-volume mode of the AFM operation. The 1 Hz data collection used in Park et al [1] would require requires 10-30 minutes (depending on topology of the surface) in the force-volume mode to collect the data with a single frequency. With collecting frequency data in the range of 50-300 Hz [1], one would need at least 10 frequency points (better 20 or more). So, the time required to obtain data per cell should be in the range between 5 hours (16×16 pixels, 3 regions, 10 minutes per FV scan, and 10 points) to 30 hours (16×16 pixels, 3 regions, 30 min, 20 points) for a single cell. While doing measurements for several hours per cell is theoretically feasible, in practice this would require too much work to collect reasonable statistics (at least ~10 cells). Cancer cells, for example, will require even more cells to measure due to their intrinsically high variability. Moreover, those cells are much more sensitive to the environment, and consequently, it is harder to maintain their viability over extended period of time.

SUMMARY OF THE INVENTION

The object of the invention is an apparatus and method including hardware and software, which allows collecting and analyzing data to obtain information about mechanical properties of soft materials in a much faster way. The apparatus can be used as a stand-alone device or an add-on to the existing AFM device. The apparatus allows collecting dynamical measurements using a set of multiple frequencies of interest at once, in one measurement instead of sequential, one frequency in a time, measurements.

BRIEF DESCRIPTION OF DRAWINGS

The foregoing aspects and many of the attendant advantages of this invention will become more readily appreciated as the same becomes better understood by reference to the following detailed description, when taken in conjunction with the accompanying drawing, wherein:

The FIGURE illustrates a block diagram of a preferred embodiment of the invention.

DESCRIPTION OF THE INVENTION

Figure 1:
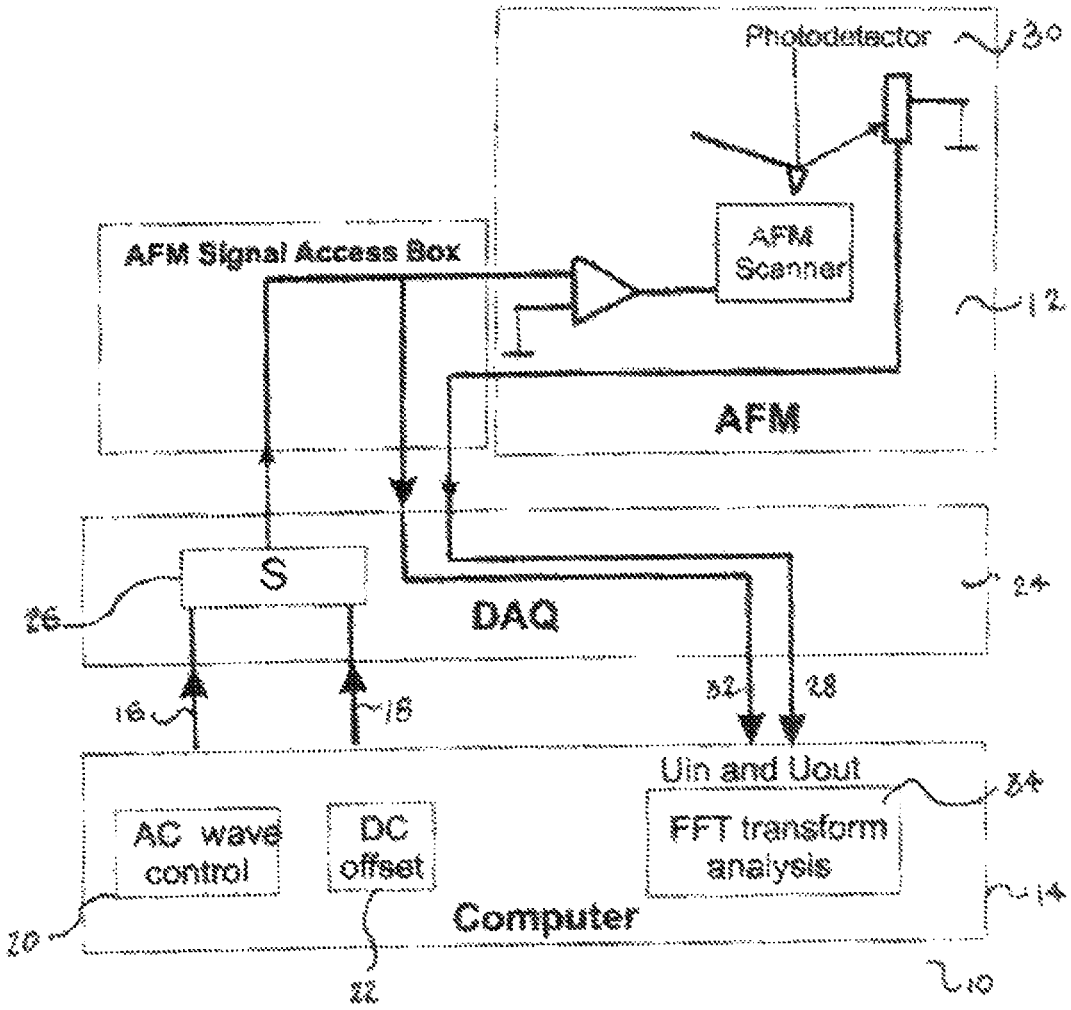

The solution to the problem outlined above is the subject of the present invention. It is based on a concept similar to that described in "Analysis of experimental Constraints and variables for time resolved detection of Fourier transform electrochemical impedance spectra." (FT-EIS), by Garland et al[3]. In that technique all frequencies of interest are sent to the probe all at once, in parallel, not sequentially as done regularly. The key point of the Garner technique is that there is no cross-talk (non-linear response) between oscillations with different frequencies, provided the amplitudes of oscillations are sufficiently small. As was shown and proven in Garland et al. and Popkirov et al [3,4], this is n universal behavior which doesn't depend on complexity of the system being measured (mathematics used to prove the above statement operates with some "response" function, which could have not necessarily be electrochemical, but viscoelastic nature, as well). That is why this approach will work for the study of mechanics of soft matter. This is because the cross-talk is a non-linear response that is proportional to higher orders of amplitude than the linear term. Consequently, it decays faster with the decrease of the oscillation amplitudes.

The realization of the solution requires a change in hardware and software of an existing AFM setup. However, the AFM approach is easier to implement than FT-EIS, which requires a specially built potentiostat. Therefore, it is expected that the new technique will be broadly used.

The FIGURE illustrates the hardware and software apparatus 10. The control of the AFM scanner 12 is undertaken by a computer 14 running software written in programming language (for example, LabView, C, Visual Basic, Matlab). An AC wave consisting of definite number of frequencies (ranging from 0.001 *Hz* to tens of MHz) 16 and a DC offset, 18 ranging from zero to a voltage required to produce the deflection of the AFM scanner sufficient to make deformation of interest of the surface being studied) is generated by a set of signal generators, 20 and 22. An example of technical realization of such the generators includes multifunctional Data Acquisition (DAQ) cards. 24 For example, National Instruments, Inc. provides a variety of such cards. Both signals are sent together (through an amplifier) to control the AFM scanner. In this way, a slow DC offset used to move the tip up and down, is superimposed within block "S" 26 with the high frequency but, small amplitude AC wave that consists of a large number of individual sine-waves of different frequencies. This provides the AFM scanner with the required oscillations together with a slow changing of the load force. The signal from the AFM cantilever 28 (for example, from the AFM photo detector 30 in the example of an optical system of detection of the cantilever deflection) is collected, and together with the input signal 32 are analyzed by FFT (Fast Fourier Transform) 34 method. For example, The Lab VIEW Fourier transform VI is described in the Lab VIEW manual and is hereby incorporated by reference). Because of the viscoelastic response of the material being studied, the phase of the collected signal (with respect to the input signal) will change, and is to be calculated. The FFT method allows calculating both the amplitude and phase of the signals of different frequencies simultaneously. This makes data analysis very fast. All details of calibration, removal of contribution of liquid etc. are described in the Park et al.(1), Mahaffy et al.(5), Mahaffy et al.(6), and Alcaraz et al.(7). [1,5-7].

The invented method allows reducing the required time per cell to less than 1.5 hours, generally between 0.5-1.5 hours, which is a significant reduction from prior methods and is a practical time because it is not only less than the lifetime of a cell in our experiments on epithelial cells, but also fairly stable rigidity measurements on a single cell is observed during ~2 hours. Therefore the method claimed overcomes the fragility of the cells.

Apart from the application to the cell mechanics, the invented method can also be used in a variety of applications. Because the method allows considerable acceleration in measuring dynamical mechanical properties, it is expected to allow studying fast changes in viscoelastic properties of changing materials such as biological materials, reactive soft materials, polymers, etc.

The illustrative embodiments and modifications thereto described hereinabove are merely exemplary. It is understood that other modifications to the illustrative embodiments will readily occur to persons of ordinary skill in the art. All such modifications and variations are deemed to be within the scope and spirit of the present invention as will be defined by the accompanying claims.

REFERENCES

The following references are hereby incorporated by reference:

1. Park S, Koch D, Cardenas R, Kas J, Shih C K. Cell motility and local viscoelasticity of fibroblasts. Biophys J 2005; 89(6):4330-42.
2. Berdyyeva T K, Woodworth C D, Sokolov I. Human epithelial cells increase their rigidity with ageing in vitro: direct measurements. Physics in Medicine and Biology 2005; 50(1):81-92.
3. Garland J E, Pettit C M, Roy D. Analysis of experimental constraints and variables for time resolved detection of Fourier transform electrochemical impedance spectra. Electrochimica Acta 2004; 49:2623-2635.
4. Popkirov G S, Schindler R N. The Perturbation Signal for Fast Fourier Transform Electrochemical Impedance Spectroscopy (FFT-EIS). Bulg. Chem. Comm. 1994: 27:459.
5. Mahaffy R E, Park S, Gerde E, Kas J, Shih C K. Quantitative analysis of the viscoelastic properties of thin regions of fibroblasts using atomic force microscopy. Biophys J 2004; 86(3):1777-93.
6. Mahaffy R E, Shih C K, MacKintosh F C, Kas J. Scanning probe-based frequency-dependent microrheology of polymer gels and biological cells. Phys Rev Lett 2000; 85(4): 880-3.
7. Alcaraz J, Buscemi L, Grabulosa M, Trepat X, Fabry B, Farre R, Navajas D. Microrheology of human lung epithelial cells measured by atomic force microscopy. Biophys J 2003 March; 84(3):2071-9.

I claim:

1. A device comprising:

performing a fast dynamical mechanical response of soft materials further comprising:

an atomic force microscope scanner having a cantilever and a probe;

a computer programmed to provide [said] AC signals and [said] *a* DC offset voltage;

said AC signals coupled to a first input of [said] *a* summing device;

said DC offset voltage coupled to a second input of said summing device;

said summing device provides said AC signals and said DC offset voltage to said atomic force microscope [access box] and a first input of a computer via *a* data acquisition card;

[said access box provides] said summed signal *is coupled* to an input of said atomic force microscope scanner;

[said access box receives an output signal from said atomic force microscope scanner;]

[said] *an* output signal *is* coupled to a second input of said computer from said atomic force microscope [access box] via said data acquisition card;

said computer programmed to conduct an analysis of data from said summation device and said atomic force microscope scanner, wherein said program conducts a Fast Fourier Transform analysis of said data.

2. The apparatus of claim 1 wherein said analysis is completed in a time of less than 1.5 hours.

3. The apparatus of claim 1 wherein said AC signals further comprise a plurality of frequencies between [1000] *0.001* Hz and [100] *tens of* MHz.

4. The apparatus of claim 1 wherein an amplitude of said AC signals is sufficiently small to avoid cross-talk (non-linear response) between signals of different frequencies.

5. The apparatus of claim 1 wherein said DC offset voltage ranges from zero to a voltage required to produce a deflection of said scanner being used to make deformation of interest relative to a sample being studied.

[6. The apparatus of claim 1 wherein said probe is a photo detector.]

7. The apparatus of claim 1 wherein said analysis includes the study of fast changes in viscoelastic properties of materials such as biological materials, reactive soft materials, or polymers.

8. An apparatus comprising:

providing input signals to and receiving [from] an output signal from an [external] atomic force microscope scanner for performing a fast dynamical mechanical response analysis of soft materials further comprising:

a computer programmed to provide [said] AC signals and [said] *a* DC offset voltage;

said AC signals *are* coupled to a first input of a summing device;

said DC offset voltage *is* coupled to a second input of said summing device;

said summing device provides said AC signals and said DC offset voltage to said atomic force microscope [access box] and a first input of a computer via a first data acquisition card;

said [access box provides] summed signal *is coupled* to an input of said [external] atomic force microscope scanner;

[said access box receives an output signal from said external atomic force microscope scanner;]

[said] *an* output signal *from said atomic force microscope scanner is* coupled to a second input of said computer [from said atomic force microscope access box] via a second data acquisition card;

said computer programmed to conduct an analysis of data from said summation device and said external atomic force microscope scanner, wherein said program conducts a Fast Fourier Transform analysis of said data.

9. The apparatus of claim 8 wherein said analysis is completed in a time of less than 1.5 hours.

10. The apparatus of claim 8 wherein said signals comprise a plurality of frequencies between [1000] *0.001* Hz and [100] *tens of* MHz.

11. The apparatus of claim 8 wherein an amplitude of said AC signals are sufficiently small to avoid cross-talk (non-linear response) between signals of different frequencies.

12. The apparatus of claim 8 wherein said DC offset voltage ranges from zero to a voltage required to produce a deflection of said scanner being used to make deformation of interest to sample being studied.

13. The apparatus of claim 8 wherein said analysis includes the study of fast changes in viscoelastic properties of materials such as biological materials, reactive soft materials, or polymers.

14. A method comprising:

performing a fast dynamical mechanical response of soft materials further comprising:

generating a plurality of AC signals;

generating a variable DC offset voltage;

summing said plurality of AC signals and said DC offset voltage;

coupling said summed signal to an input of an atomic force microscope scanner and to an input of a data acquisition card;

using a cantilever and probe portion of said scanner to measure a sample; coupling an output of said probe to a second input of said data acquisition card;

coupling a first output of said data acquisition card representing said input signal to said scanner to a first input of said computer;

coupling a second output of said data acquisition card representing said output signal of said scanner to a second input of said computer;

performing a fast Fourier transform analysis of said sample using said input signal and said output signal.

15. The method of claim 14 wherein said analysis is completed in a time of less than 1.5 hours.

16. The method of claim 14 wherein said signals comprise a plurality of frequencies between [1000] *0.001* Hz and [100] *tens of* MHz.

17. The method of claim 14 wherein an amplitude of said AC signals are sufficiently small *to* avoid cross-talk (non-linear response) between signals of different frequencies.

18. The method of claim 14 wherein said DC offset voltage ranges from zero to a voltage required to produce a deflection of said scanner being used to make deformation of interest to sample being studied.

19. The method of claim 14 wherein said analysis includes the study of fast changes in viscoelastic properties of materials such as biological materials, reactive soil materials, or polymers.

*20. The apparatus of claim 3, wherein said AC signals further comprise a plurality of frequencies between 5 Hz and 300 Hz.*

*21. The apparatus of claim 10, wherein said AC signals further comprise a plurality of frequencies between 5 Hz and 300 Hz.*

*22. The apparatus of claim 16, wherein said AC signals further comprise a plurality of frequencies between 5 Hz and 300 Hz.*

* * * * *